United States Patent [19]

Zahn et al.

[11] Patent Number: 5,638,153
[45] Date of Patent: Jun. 10, 1997

[54] MASKING OF TRANSPARENCIES FOR COPYING

[75] Inventors: Wolfgang Zahn; Friedrich Jacob, both of Munich; Eberhard Schulz, Unterhaching, all of Germany

[73] Assignee: AGFA-Gevaert Aktiengesellschaft, Leverkusen, Germany

[21] Appl. No.: 433,956

[22] Filed: May 4, 1995

Related U.S. Application Data

[63] Continuation of Ser. No. 72,499, Jun. 4, 1993, abandoned.

[30] Foreign Application Priority Data

| Jun. 25, 1992 | [DE] | Germany | 42 20 918 |
| Jul. 4, 1992 | [DE] | Germany | 42 21 995 |
| Sep. 15, 1992 | [DE] | Germany | 42 30 840 |

[51] Int. Cl.⁶ ............................................ G03B 27/80
[52] U.S. Cl. ............................ 355/35; 355/71; 348/362
[58] Field of Search .................. 355/35, 71; 340/784; 348/362

[56] References Cited

U.S. PATENT DOCUMENTS

| 4,536,778 | 8/1985 | De Schamphelaere et al. | 346/160 |
| 4,857,906 | 8/1989 | Conner | 340/784 |
| 4,927,242 | 5/1990 | Aoki et al. | 350/346 |
| 5,084,727 | 1/1992 | Maronian et al. | 355/68 |
| 5,155,524 | 10/1992 | Oberhardt et al. | 355/68 |
| 5,218,402 | 6/1993 | Beaulieu et al. | 355/38 |

FOREIGN PATENT DOCUMENTS

2-76481  3/1990  Japan.

*Primary Examiner*—Safet Metjahic
*Assistant Examiner*—D. P. Malley
*Attorney, Agent, or Firm*—Darby & Darby

[57] ABSTRACT

A transparency to be reproduced is positioned in register with copy material having respective sensitivity maxima in the blue, green and red wavelength ranges of the spectrum. An illuminating unit for exposing the copy material includes an array of cells such as an LCD. The density of each cell can be varied individually to thereby change the illumination intensity, and the densities are adjustable in such a manner that, in the spectral ranges corresponding to the neighborhoods of the sensitivity maxima, the density of each cell changes by approximately the same factor.

52 Claims, 5 Drawing Sheets

MASKING OF TRANSPARENCIES FOR COPYING

This is a continuation of application Ser. No. 08/072,499, filed Jun. 4, 1993, Now abandoned.

BACKGROUND OF THE INVENTION

The invention relates generally to the copying of a master.

More particularly, the invention relates to the copying of a transparency on photosensitive material where the latter is exposed to light of the primary colors blue, green and red.

For photographs having individual areas with large brightness differentials, the copies are often overexposed in the light regions and underexposed in the dark regions. As a result, details and fine structures are poorly visible or completely invisible on the copies.

The German patent 28 20 965 discloses a copying apparatus having a liquid crystal display between the light source and the film. A black-and-white negative mask of an exposure to be reproduced is formed on this display by means of an electric control mechanism. When the copy paper is now exposed using light which has passed through the mask and the exposure, a desired density compression is achieved. However, it has been found that color errors are present in the copies.

SUMMARY OF THE INVENTION

It is an object of the invention to provide a copying apparatus which enables copy quality to be improved.

Another object of the invention is to provide a masking arrangement which allows color errors in copies to be reduced or eliminated.

An additional object of the invention is to provide a copying method which makes it possible to improve copy quality.

A further object of the invention is to provide a copying method which permits color errors in copies to be reduced or eliminated.

The preceding objects, as well as others which will become apparent as the description proceeds, are achieved by the invention.

One aspect of the invention resides in an apparatus for copying a master, particularly a transparent master. The apparatus comprises a first holder or first positioning means for positioning the master at a first location, and a second holder or second positioning means for positioning copy material, e.g., photographic copy paper, at a second location. The copy material, which may be photosensitive, has respective sensitivity maxima in a plurality of preselected colors. The apparatus further comprises means for forming an image of the master on the copy material when the master is positioned at the first location and the copy material is positioned at the second location. The forming means includes a unit for exposing the master to illumination of the preselected colors and this unit comprises a plurality of zones each having an independently variable intensity. The apparatus additionally comprises means for changing the intensities of the zones in such a manner that, in the spectral ranges corresponding to the neighborhoods of the sensitivity maxima, the intensity of each zone changes by approximately the same factor.

The zones of the exposing or illuminating unit may be considered to function as a mask.

The preselected colors are preferably the primary colors blue, green and red. The apparatus can be designed so that, at least on occasion, the copy material is exposed to these three primary colors simultaneously. The changing means may be arranged to produce approximately equal changes in average intensity over the spectral ranges of 420 nm to 490 nm, 500 nm to 560 nm and 670 nm to 730 nm.

The apparatus of the invention makes it possible to eliminate the dependence of the coloring of a copy on the degree of masking. The "color neutrality" of the illuminating unit does not mean that the copy light has no coloring. Rather, the coloring does not change in spite of the fact that the intensity or brightness varies from zone to zone. The coloring of the copy light is the same for different degrees of masking. This does not refer to the visible color range but to the wavelength ranges corresponding to the color sensitivity of the copy material. A change in coloring with different degrees of masking is referred to as color distortion of the mask.

As just indicated, the color neutrality of the mask should be in the wavelength ranges where the copy material has its most significant sensitivity instead of in the visible spectrum. Differences exist particularly in the red color range. While the sensitivity maximum of photographic paper normally lies at a wavelength of more than 700 nm, the eye has a very low sensitivity at this wavelength.

In accordance with one embodiment of the invention, the illuminating unit consists solely of an LED matrix. The individual LEDs can be controlled independently of one another so that the so that the source of illumination itself also serves as a mask.

According to another embodiment of the invention, the illuminating unit includes a conventional source of illumination, e.g., a lamp, filter arrangement and reflector shaft, as well as an LCD or liquid crystal matrix.

When using either an LED matrix or an LCD, it can be desirable to prevent the individual zones from being visible on the copy. This can be accomplished by projecting the zones unsharply onto the copy material and/or by interposing a matte or ground glass smoothing element between the illuminating unit and the master. The boundaries between the zones are then invisible on the copy.

If the gray values of the individual or localized zones of an LCD are to be changed directly, it is preferred to use a matrix of individual cells or zones collectively referred to as modulating elements. By precise incorporation of coloring matter in these liquid crystals, a change in intensity which is practically neutral as regards color can be achieved.

Both for an LED matrix and an LCD, having a matriy of cells it is of particular advantage for each individual zone to have its own control line. The cells can then be directly controlled individually by means of an electronic control unit.

An a.c. voltage source can be provided to regulate the intensities of the individual zones. A discrete amplifier is required for each zone to regulate the a.c. voltage.

If the illuminating unit is to have a high resolution with approximately 1,000 to 2,000 zones, an integrated circuit of the type normally used to control TFT displays can be employed. However, such a component cannot produce the high voltages necessary for high illumination intensities and correspondingly short exposure times. Hence, it may be more effective to use a pulsating d.c. voltage source. The change in intensity of the elements is achieved by a change in the effective value of the voltage. By way of example, the effective value can be changed by influencing the waveform of the voltage or by regulating the number of transmitted pulses. This can be accomplished by assigning a change-over switch to each element which can selectively connect the element to a d.c. voltage source and a reference potential. A common change-over switch is provided for all of the zones and allows the d.c. voltage source or the reference potential to be connected to all of the elements simultaneously. If the common change-over switch is switched at a frequency in the kHz range, e.g., at a frequency of 1 to 100 kHz, an individual element can be activated when the associated individual change-over switch is set in a sense opposite to the common change-over switch. When the common change-over switch is set in the same sense as the change-over switch for an individual element, the respective element is deactivated. The intensity of a element can be regulated by causing the associated change-over switch to be set in a sense opposite to the common change-over switch a certain number of times during a predetermined period, and by causing the associated change-over switch to be set in the same sense as the common change-over switch a certain number of times during this period. The effective value of the voltage can be controlled through the sizes of transmitted pulse packets.

The switching frequency of the common change-over switch should be kept as low as possible in order that a LCD, for example, may be supplied with a high voltage (corresponding to a high transparency) in spite of high resistance in the line between the voltage source and the element. A certain inconsistency exists here since, on the other hand, a high frequency is necessary to be able to generate enough different transparency levels or steps. This is due, in particular, to the nonlinear voltage-transparency curves of present LCDs. In a preferred embodiment of the invention, therefore, the switching frequency of the common change-over switch is periodically changed. Each period begins with a high frequency and ends with a low frequency. Consequently, the pulse width increases during a period. The voltage can likewise be varied within a period. This makes it possible to generate a voltage profile which, in each period, has only as many pulses as required transparency stages and is nevertheless very well matched to the nonlinear transparency curves of the LCDs.

For a large number of individual zones, the common change-over switch can be constructed discretely while the change-over switches assigned to the individual elements can be formed by one or more conventional integrated circuits. When the elements are in the form of a matrix or display, it is advantageous to mount the integrated circuit or circuits directly on the matrix so as to avoid long conducting paths and a large number of control lines between the matrix and an electronic control unit for the same.

Another way of achieving a neutral change, as regards color, for the elements of the illuminating unit is by means of a bright/dark transition. To this end, the individual elements can be divided into subzones each of which can be switched between two states or conditions, namely, a "bright" state and a "dark" state. A subzone which has been switched to the "dark" condition transmits practically no illumination of wavelengths classified as significant. For each zone, different gray stages can be obtained without color distortion by changing the combination of active and inactive subzones. It is preferred here to use ferroelectric liquid crystals.

Ferroelectric liquid crystals have a bistable character. This means that each subzone or cell need be operated on only once before a copying procedure in order to bring it into the required state. It maintains this state until it is operated on again. Simple control of a matrix or display of the zones is made possible by virtue of this bistable character.

In order that the individual zones may have sufficiently fine gradations in intensity, it is preferred for each element to have six different subzones. When the subzones of a given element are dimensioned such that the sum of the areas of a first combination of subzones does not equal the area of any single subzone nor the sum of the areas of a second combination of subzones, an intensity gradation with sixty-four individual steps or levels can be achieved with six different subzones per element. For a uniform gradation, the areas of the six subzones should be in the ratio of 1:2:4:8:16:32. This ratio can be appropriately changed if, for instance, a finer gradation is required at high intensity than at low intensity, or vice versa.

If a smaller number of subzones per element is desired, the number of intensity levels can be increased by means of a timing circuit. If, for example, there are to be only two subzones per element so that only four intensity levels would normally be available, the number of levels can be increased via a control unit which makes it possible to once again switch states during the exposure in a copying procedure.

Another aspect of the invention resides in a method of copying a master, particularly a transparent master, on copy material. The copy material, which may be photosensitive, has respective sensitivity maxima in a plurality of preselected colors. The method comprises the step of positioning the master and the copy material in predetermined relationship to a unit for exposing the master to illumination of the preselected colors so as to form an image of the master on the copy material. The exposing or illuminating unit includes a plurality of elements each having an independently variable intensity, and the method further comprises the step of adjusting the intensities of the elements in such a manner that, in the spectral ranges corresponding to the neighborhoods of the sensitivity maxima, the intensity of each zone changes by approximately the same factor.

The copy material may, for instance, be constituted by photographic paper.

The preselected colors may be the primary colors blue, green and red, and the adjusting step may include producing approximately equal changes in average intensity over the spectral ranges of 420 nm to 490 nm, 500 m to 560 nm and 670 nm to 730 nm. The method can additionally comprise the step of forming an image of the master on the copy material, and the forming step may involve exposing the copy material at one time to blue, green and red illumination coming from the master. It is possible to carry out at least part of the adjusting step during the forming step.

The positioning step may include locating the copy material in a predetermined plane, and the method can then further comprise the step of unsharply projecting the elements onto such plane.

The adjusting step may involve applying either an a.c. voltage or voltage pulses to the elements. The operation of applying voltage pulses to the element can include generating a varying number of voltage pulses per unit of time, generating a set of voltage pulses having different pulse widths and/or generating a set of voltage pulses having different amplitudes. When a set of voltage pulses with different pulse widths is generated, the pulse width of successive pulses of the set may increase progressively.

The adjusting step can also involve applying voltage of variable effective value and substantially constant peak value to the elements.

The method may additionally comprise the step of monitoring the intensities of the elements. The positioning step can include locating the master and the copy material in an optical path for projection of an image of the master onto the copy material, and the monitoring step can be performed outside of this path. It is also possible for the monitoring step to involve a sensing of the illumination coming from the elements. At least part of the adjusting step may here be performed in automatic response to the sensed illumination.

The adjusting step may comprise switching subzones of at least one of the elements between a bright state and a dark state. The adjusting step may further comprise changing the number or combination of subzones having the bright state.

The novel features which are considered as characteristic of the invention are set forth in particular in the appended claims. The improved copying method, as well as the construction and mode of operation of the improved copying apparatus, together with additional features and advantages thereof, will, however, be best understood upon perusal of the following detailed description of certain specific embodiments when read in conjunction with the accompanying drawings.

DESCRIPTION OF THE PREFERRED EMBODIMENTS

Figure 1:
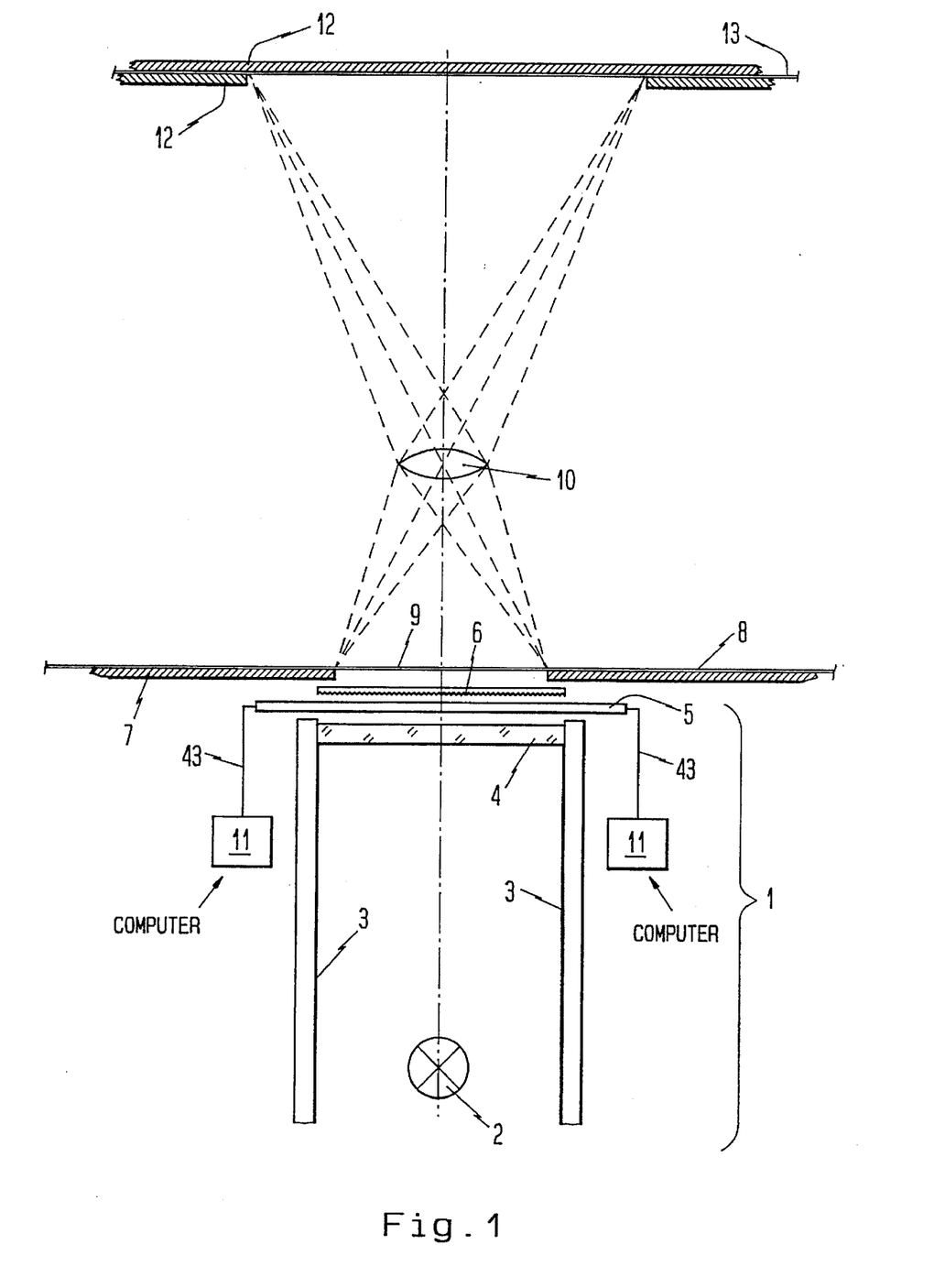
FIG. 1 schematically illustrates a copying apparatus in accordance with the invention.

FIG. 1 shows an apparatus according to the invention for copying or printing a master 9 on copy material 13. The master 9 is here assumed to be a transparent exposure or frame of a negative film 8 while the copy material 13 is assumed to be a photosensitive material such as photographic paper.

The copying apparatus or copier includes an illuminating or exposing unit 1 which serves to illuminate the master 9 and to expose the copy material 13. The illuminating unit 1 includes a light source 2, a mixing tube 3, a diffusing disc 4, an LCD 5, and a matte or ground glass smoothing disc 6. The LCD 5, which may also be considered a matrix of individual cells, can be replaced by an LED matrix. This allows the light source 2, the mixing tube 3 and the diffusing disc 4 to be eliminated. The light emitted by the illuminating unit 1 includes the wavelength ranges corresponding to the primary colors blue, green and red, and the copy material 13 is, at least on occasion, exposed to radiation in all of these wavelength ranges simultaneously.

A support or platen 7 is provided for the film 8 and defines a support plane for the same. Similarly, a support or platen 12 is provided for the copy material 13 and holds the latter flat in a predetermined plane during exposure. An objective 10 functions to project an image of the master 9 onto the copy material 13.

The illuminating unit 1, objective 10 and platens 7, 12 at least in part constitute a copying or printing station of the copying apparatus.

The film 8 is transported along a predetermined path in order to bring different frames into register with the illuminating unit 1. Upstream of the copying station is a non-illustrated scanning station in which the frames of the film 8 are scanned to generate density values. The density values obtained in this manner are sent to a computer 11 where they are transformed into control values representing an unsharp mask. The control values are used to regulate the LCD 5 which serves as a mask. Control lines 43 connect the computer 11 to the LCD 5.

LCDs have been found to be especially well-suited for masking. Thus, the gray value or transparency of these LCDs is voltage-dependent. Moreover, they are highly stable as regards temperature and their transparency as well as color neutrality depend to only a small degree on the viewing angle. However, to employ a guest-host LCD having these advantages, individual control of each cell is desirable.

Figure 2:
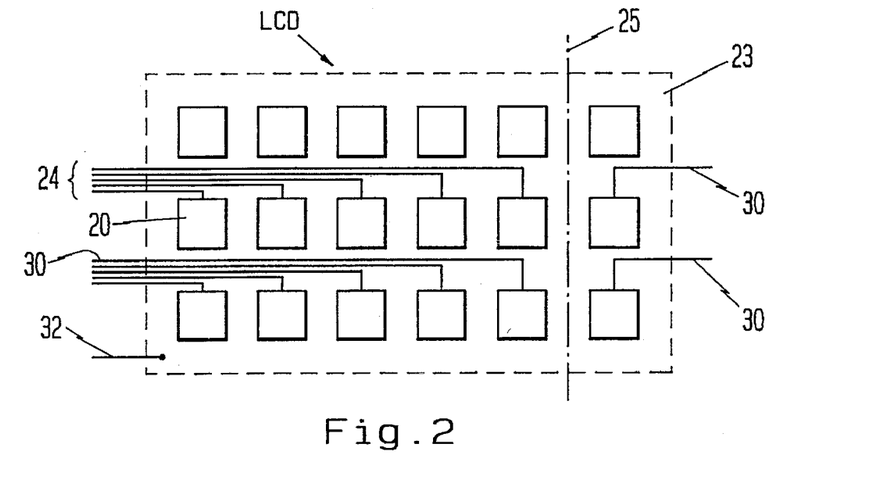
FIG. 2 is first embodiment of an enlarged, fragmentary plan view of an LCD which can constitute part of an illuminating unit for a copying apparatus according to the invention.

An enlarged, fragmentary view of a first embodiment of an LCD or matrix of cells is shown in FIG. 2. The individual cells are identified by the reference numeral 20, and each cell 20 has its own control line 30 for incoming signals. The cells 20 are mounted on a conducting board 23 which functions as a common output for all of the cells 20. A control line 32 common to all of the cells 20 is connected to the board 23. The control lines 30 extend between the individual cells 20 in the form of conductor bundles 24. To reduce the number of lines per bundle, the control lines 30 to the left and right of the center 25 of the LCD are bundled separately.

To avoid galvanic processes in the individual cells 20, these should be subjected to an a.c. voltage. The transparency of the cells 20 can then be regulated by the effective value of the a.c. voltage. However, since it can be extremely expensive to amplify the a.c. voltage in the same manner for each individual cell 20 of the matrix, it is preferred to use voltage pulses. The effective voltage can then be controlled via the number of voltage pulses transmitted to the cells 20.

Figure 3A:
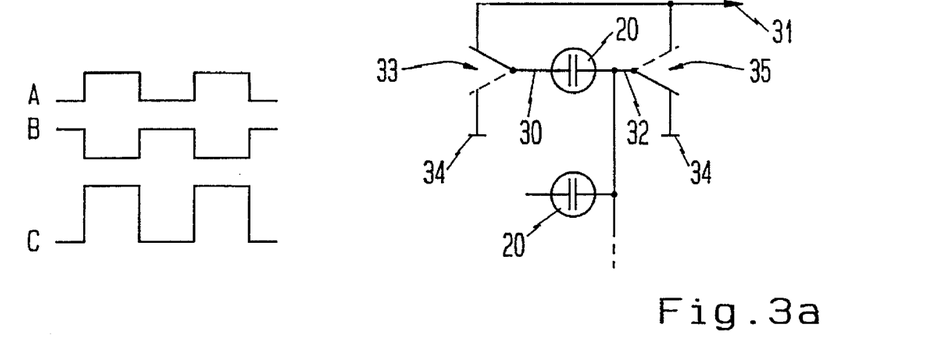
FIGS. 3a and 3b show one embodiment of a switching arrangement for the LCD of FIG. 2.
Figure 3B:
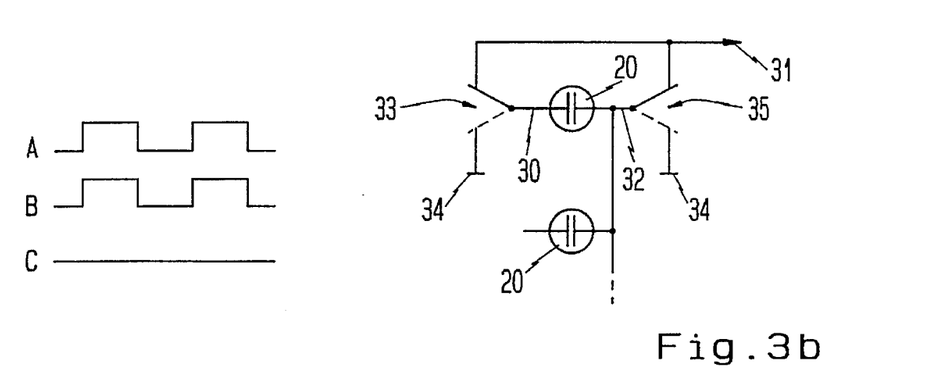

A particularly simple embodiment of a circuit for generating voltage pulses is illustrated in FIGS. 3a and 3b. The individual control line 30 for a cell 20 is connected to a change-over switch 33 which can connect the cell 20 to either a d.c. voltage supply 31 as shown by an unbroken line or a reference potential 34 as shown by a broken line. The common control line 32 for all of the cells 20 is connected to a change-over switch 35 which is likewise common to all of the cells 20. Again, the change-over switch 35 can connect the cells 20 to either the d.c. voltage supply 31 as shown by a broken line or the reference potential 34 as shown by an unbroken line. The switches 33, 35 are switched back-and-forth between their broken line and unbroken line positions at a predetermined frequency, e.g., 40 kHz. A square-wave d.c. voltage A is thus generated in the individual control lines 30 while a square-wave voltage B is generated in the common control line 32.

FIG. 3a illustrates the switching arrangement in a condition in which the square-wave voltages A, B yield a resultant voltage C in the form of a train of voltage pulses which are applied to the cells 20. In contrast, FIG. 3b illustrates the switching arrangement in a condition in which the square-wave voltages A, B yield a steady resultant voltage C so that the cells 20 are not subjected to voltage pulses. The voltages C applied to the cells 20 are due to the voltage reversal occurring upon each switching operation.

Assuming, for each cell 20, that a transparency gradation of approximately 50 density levels or steps is adequate for masking and that the respective cell 20 behaves linearly, a control period corresponding to 50 individual pulses is established. Regulation of the effective voltage, and thus the density level of a cell 20, then occurs through the number of transmitted pulses per control period. Only the individual change-over switches 33 need be controlled for this purpose whereas the common change-over switch 35 switches continuously at a predetermined frequency.

Figure 4:
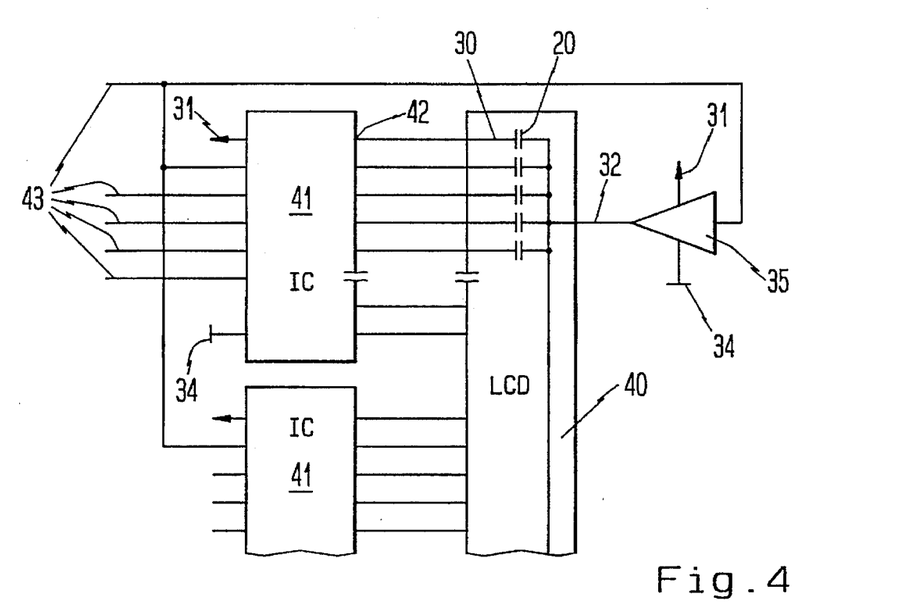
FIG. 4 shows another embodiment of the switching arrangement.

Referring to FIG. 4, a matrix or display of individual cells 20 is identified by the reference numeral 40. The common change-over switch 35 is constructed discretely and, as before, switches the common control line 32 to either the voltage supply 31 or the reference potential 34. Each of the cells 20 is again provided with its own change-over switch, and the individual switches are here contained in integrated circuits 41 which are connected to the voltage supply 31 and the reference potential 34. The individual switches of the integrated circuits 41 are connected to the control lines 30 of the corresponding cells 20 via respective outputs 42 of the integrated circuits 41. The matrix 40 is connected to the computer 11 of FIG. 1 by means of the control lines 43.

If the integrated circuits 41 are mounted on their own printed circuit boards, each output 42 of the integrated circuits 41 must be contacted with the matrix 40 via a respective flexible connecting element. It is therefore preferred for the integrated circuits to be mounted directly on the matrix 40. Only a small number of control lines, which serve to connect the matrix 40 to the computer 11, are then required.

Figure 5A:
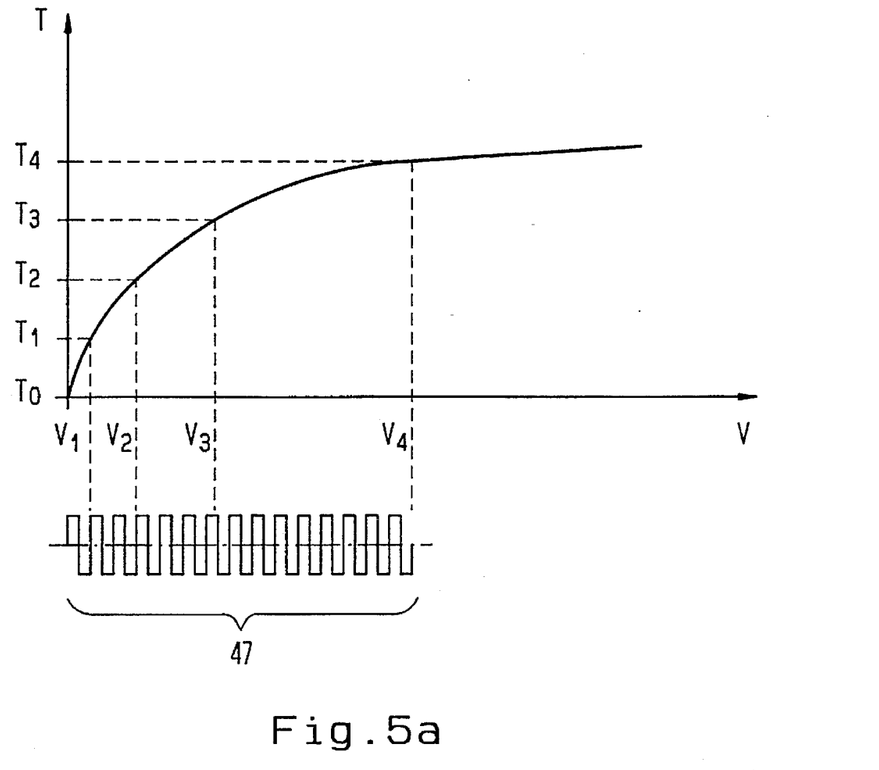
FIGS. 5a and 5b illustrates a transparency-voltage curve for the LCD of FIG. 2 as well as sequences of voltage pulses for obtaining different transparencies on the curve.

FIG. 5a shows a nonlinear transparency curve for a guest-host cell. In order to attain the uniformly spaced transparency levels or steps T1, T2, T3, T4, the cell must be subjected to the voltages V1, V2, V3, V4, respectively. The requisite voltage V1, V2, V3 or V4 is obtained by transmitting only a specified number of voltage pulses to the cell during each control period 47. In the example of FIG. 5a, every control period 47 must correspond to at least 15 voltage pulses in order to achieve an approximately uniform gradation with four transparency levels. It will be observed that the voltage V3 cannot be obtained with a whole number of voltage pulses so that a higher pulse frequency would be required for a more precise gradation.

Figure 5B:
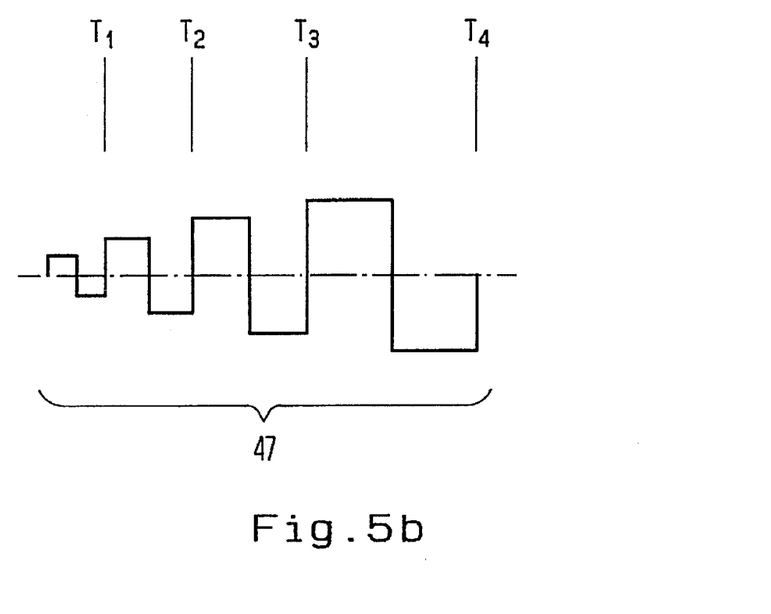

FIG. 5b shows a preferred sequence of voltage pulses for achieving the transparency levels T1, T2, T3, T4. Here, both the pulse width and amplitude are varied during each control period 47. This makes it possible to match practically any transparency curve even though the number of pulses is no higher than the number of transparency levels. For each transparency level T1, T2, T3, T4, the illustration shows the instant within the control period 47 at which no further pulses need be transmitted to the cell in order to achieve the respective transparency level T1, T2, T3 or T4.

Figure 6A:
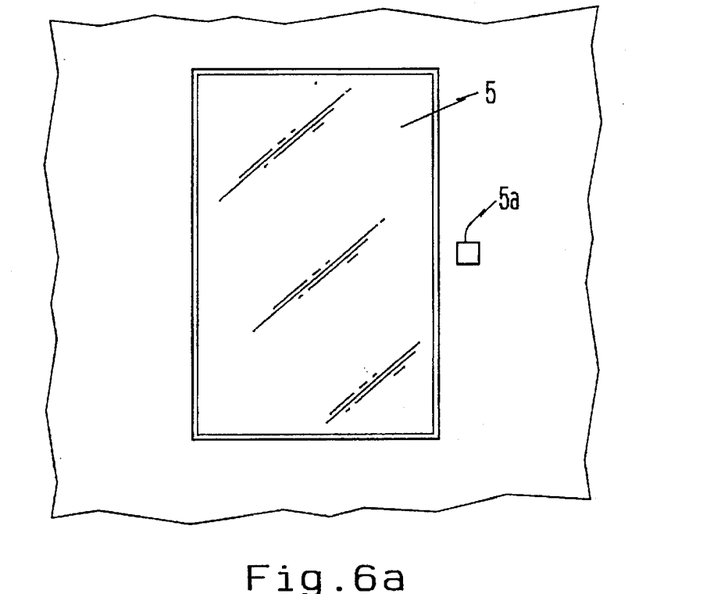
FIGS. 6a and 6b show an arrangement for monitoring the transparency of the LCD of FIG. 2.
Figure 6B:
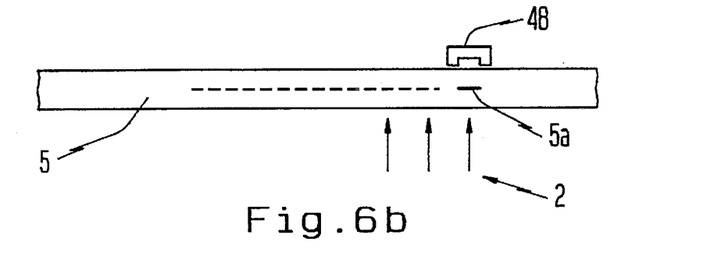

FIGS. 6a and 6b show an arrangement which can be used in the copying apparatus of FIG. 1 to monitor the density of the LCD 5. The monitoring arrangement includes a test pixel 5a which is mounted on the LCD 5 outside of the projected cross section of the mixing tube 3 but within the sphere of illumination of the light source 2. The test pixel 5a is surrounded by a shield so that a photosensor 48 above it detects only light which has passed through the test pixel 5a. The transmittance of the test pixel 5a is regulated in the same manner and by the same control unit as the transmittances of the masking cells located within the projected cross section of the mixing tube 3. By continuously illuminating the test pixel 5a with light from the light source 2, the transmittance of the pixel 5a can be checked via the photosensor 48. If the measurements fall outside of a predetermined range, the apparatus can generate an appropriate warning signal for an operator.

At greater time intervals, it is further possible to check the uniformity of the transmittances of the masking cells. To this end, the photosensor can be mounted on a device which is shiftable in two mutually perpendicular directions. The device successively travels by all of the masking cells of the LCD 5 and, for each cell, measures the intensity value which is generated by the photosensor 48 and represents the transmittance of the cell. When the intensity values lie outside a preselected range, the voltage in the control circuit can be adjusted automatically. This allows precise adjustment of the LCD 5 to be achieved. Thus, the uniformity of the transmittances of the masking cells can be checked at predetermined time intervals, for example, and reestablished if deviations occur.

Figure 7:
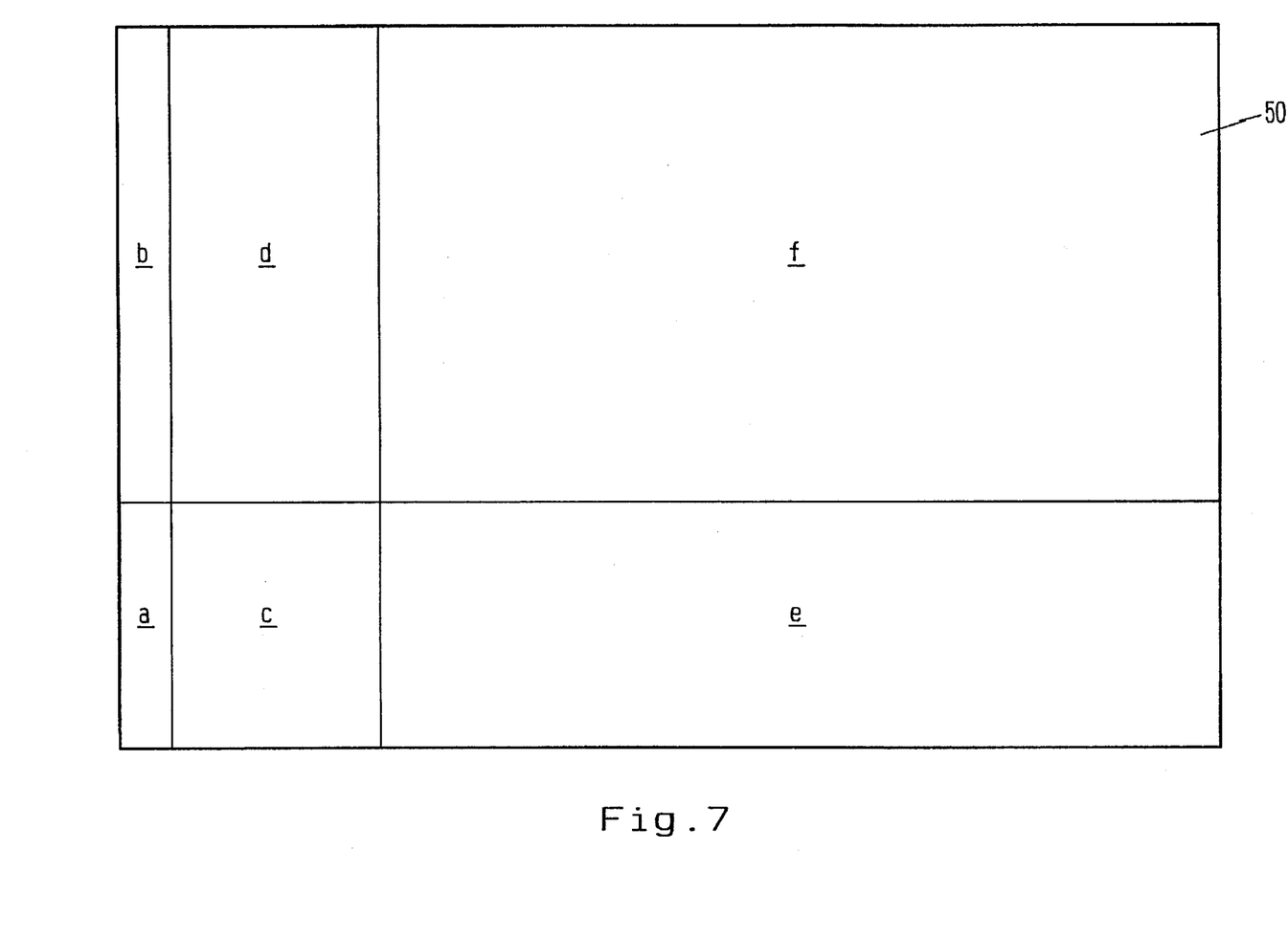
FIG. 7 illustrates another embodiment of an LCD which can constitute part of an illuminating unit for a copying apparatus in accordance with the invention.

FIG. 7 illustrates a second embodiment of an LCD in which a ferroelectric LCD or matrix is used for masking. The matrix is divided into a large number of individual or localized zones 50 of which only one is shown in FIG. 7, and each zone 50 is again divided into individually controllable subzones. The zone 50 of FIG. 7 contains six subzones a,b,c,d,e,f. Prior to a copying procedure, the subzones a,b,c,d,e,f are operated on once, e.g., by the computer 11 of FIG. 1, so as to place each subzone a,b,c,d,e,f in a state of either maximum transparency or minimum transparency. The matrix of zones are preferably powered and controlled by the known method of multiplexing.

The subzones a,b,c,d,e,f have different sizes and are designed such that the sum of the areas of a first combination of individual subzones a,b,c,d,e,f does not equal the area of any single subzone a,b,c,d,e,f or the sum of the areas of a second combination of individual subzones a,b,c,d,e,f. The possible combinations of the individual subzones a,b,c,d,e,f allow the zone 50 to assume sixty-four different transparency levels. When the areas of the subzones a,b,c,d,e,f are in the ratio of 1:2:4:8:16:32, a uniform gradation between adjacent transparency levels can be achieved.

If additional transparency levels are required, time may be used as an additional variable. However, it is then necessary to perform one or more switching operations during a copying procedure. Just one switching operation during a copying procedure permits the number of transparency levels to be doubled to one-hundred and twenty-eight. Should a lesser number of transparency levels be adequate, the number of subzones per zone can be reduced accordingly.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. An apparatus for copying a master, particularly a transparent master, comprising first positioning means for positioning the master at a first location; second positioning means positioning copy material at a second location, the copy material having respective sensitivity maxima in a plurality of colors; forming means for forming an image of the master on the copy material when the master is positioned at said second location, said forming means an exposing unit for simultaneously exposing the master to illumination of said colors, and said unit comprising a plurality of modulating elements each having an independently variable intensity; and changing means for changing said intensities by a factor such that, in the spectral ranges corresponding to said sensitivity maxima, the intensity of some of said elements changes by approximately the same factor, wherein said first location, said second location and said exposing unit define an optical path for projection of an image of the master on the copy material, said master being transparent and being disposed between said exposing unit and said copy material such that light passes from said exposing unit through said transparent master and onto the copy material to form an image of the master on the copy material.

2. The apparatus of claim 1, wherein said colors are blue, green and red.

3. The apparatus of claim 1, wherein said changing means is designed to produce approximately equal changes in average intensity over the spectral ranges of about 420 nm to about 490 nm, about 500 nm to about 560 nm and about 670 nm to about 730 nm.

4. The apparatus of claim 1, wherein said exposing unit comprises LEDs.

5. The apparatus of claim 4, wherein said LEDs define a matrix.

6. The apparatus of claim 1, wherein said exposing unit comprises a source of illumination, and LCDs arranged to be illuminated by said source.

7. The apparatus of claim 6, wherein said LCDs define a matrix.

8. The apparatus of claim 1, wherein said second positioning means defines a plane for the copy material and said forming means comprises an objective arranged to unsharply project said zones onto said plane.

9. The apparatus of claim 1, wherein said forming means comprises a matte smoothing element between said exposing unit and said first positioning means.

10. The apparatus of claim 1, wherein said changing means comprises an individual control line for each of said elements.

11. The apparatus of claim 1, wherein each of said elements comprises a pigmented liquid crystal.

12. The apparatus of claim 1, wherein said changing means comprises an a.c. voltage source which is connected to said zones.

13. The apparatus of claim 1, wherein said changing means comprises means for applying voltage pulses to said elements.

14. The apparatus of claim 1, wherein said changing means comprises means for applying voltage to said elements, said applying means including generating means for generating a voltage of variable effective value and substantially constant peak value.

15. The apparatus of claim 14, wherein said generating means comprises means for producing varying numbers of voltage pulses per unit of time to thereby vary said effective value.

16. The apparatus of claim 1, wherein said changing means comprises means for applying a variable voltage to said elements, each of said elements having a first terminal and a second terminal, and said applying means including a first voltage source, a second voltage source, an individual first switch for each of said elements to selectively connect said first terminals to said voltage sources, and a common second switch for all of said elements to selectively connect said second terminals to said voltage sources.

17. The apparatus of claim 16, wherein said changing means further comprises controlling means for controlling said first switches, said controlling means being operative to produce a voltage pulse at a selected element by causing the respective terminals to be connected with different ones of said voltage sources, and said controlling means being operative to inhibit voltage pulses at said selected element by causing the respective terminals to be connected with the same one of said voltage sources.

18. The apparatus of claim 17, wherein said controlling means causes said second switch to operate at a frequency of about 1 kHz to about 100 kHz.

19. The apparatus of claim 1, wherein said changing means comprises applying means for applying voltage to said elements, said applying means including means for producing a set of voltage pulses having different pulse widths.

20. The apparatus of claim 19, wherein the pulse width of successive pulses of said set increases progressively.

21. The apparatus of claim 1, wherein said changing means comprises applying means for applying voltage to said elements, said applying means including means for producing a set of voltage pulses having different amplitudes.

22. The apparatus of claim 1, wherein said changing means comprises applying means for applying voltage to said elements, said applying means including means for producing voltage pulses, and said producing means comprising an integrated circuit.

23. The apparatus of claim 22, wherein said elements constitute part of a matrix and said circuit is mounted on said matrix.

24. The apparatus of claim 1, further comprising monitoring means for monitoring the intensities of said elements.

25. The apparatus of claim 24, wherein said first location, second location and exposing unit define an optical path for projection of an image of the master on the copy material, said monitoring means including a liquid crystal arranged outside of said path so as to be illuminated by said unit and a sensor arranged to detect illumination coming from said crystal.

26. The apparatus of claim 24, wherein said monitoring means includes a sensor movable by said elements to detect illumination coming therefrom, said changing means being coupled to said sensor so as to adjust said intensities in response to signals from said sensor.

27. The apparatus of claim 1, wherein at least one of said zones comprises a plurality of subzones each of which has a bright state and a dark state, the intensity of said one element being adjustable by varying the number of subzones having said bright state.

28. The apparatus of claim 27, wherein said one element comprises a ferroelectric liquid crystal.

29. The apparatus of claim 1, wherein at least one of said elements comprises subzones of different size each having a bright state and a dark state, the intensity of said one zone being adjustable by varying the number and combination of subzones having said bright state.

30. The apparatus of claim 29, wherein said one element comprises six subzones of different size.

31. The apparatus of claim 30, wherein the areas of said subzones are in the ratio of 1:2:4:8:16:32.

32. The apparatus of claim 29, wherein the sum of the areas of a first combination of said subzones differs from the sum of the areas of a second combination of said subzones and from the area of any one of said subzones.

33. The apparatus of claim 1, wherein said changing means comprises varying means for varying said intensities while forming an image of the master on the copy material.

34. A method of copying a master on copy material having respective sensitivity maxima in a plurality of colors, comprising the steps of positioning said master and said copy material in predetermined relationship to a unit for simultaneously exposing said master to illumination of said colors so as to form an image of said master on said copy material said unit comprising: a plurality of modulating elements each having an independently variable intensity; and adjusting said intensities of said elements by a factor such that, in the spectral ranges corresponding to said sensitivity maxima, the intensity of some of said element changes by approximately the same factor.

35. The method of claim 34, wherein said master is transparent.

36. The method of claim 34, wherein said colors are blue, green and red.

37. The method of claim 34, wherein the adjusting comprises producing approximately equal changes in average intensity over the spectral ranges of about 420 nm to about 490 nm, about 500 m to about 560 nm and about 670 nm to about 730 nm.

38. The method of claim 34, wherein the positioning includes locating said copy material in a predetermined plane; and further comprising the step of unsharply projecting said zones onto said plane.

39. The method of claim 34, wherein the adjusting comprises applying a.c. voltage to said elements.

40. The method of claim 34, wherein the adjusting comprises applying voltage pulses to said elements.

41. The method of claim 40, wherein said applying comprises generating a varying number of voltage pulses per unit of time.

42. The method of claim 40, wherein said applying comprises generating a set of voltage pulses having different pulse widths.

43. The method of claim 42, wherein the pulse width of successive pulses of said set increases progressively.

44. The method of claim 40, wherein said applying comprises generating a set of voltage pulses having different amplitudes.

45. The method of claim 34, wherein the adjusting comprises applying voltage of variable effective value and substantially constant peak value to said elements.

46. The method of claim 34, further comprising the step of monitoring the intensities of said elements.

47. The method of claim 46, wherein the positioning comprises locating said master and said copy material in an optical path for projection of an image of said master on said copy material, the monitoring being performed outside of said path.

48. The method of claim 46, wherein the monitoring comprises sensing illumination coming from said elements and at least part of the adjusting step is performed in automatic response to the sensed illumination.

49. The method of claim 34, wherein the adjusting comprises switching a plurality of subzones of at least one of said elements between a bright state and a dark state.

50. The method of claim 49, wherein the adjusting further comprises changing the number of said subzones having said bright state.

51. The method of claim 49, wherein the adjusting further comprises changing the combination of said subzones having said bright state.

52. The method of claim 34, further comprising the of forming an image of said master on said copy material, at least part of the adjusting step being performed during the forming.

* * * * *